US010790778B2

(12) United States Patent
Rakow et al.

(10) Patent No.: US 10,790,778 B2
(45) Date of Patent: Sep. 29, 2020

(54) SOLAR ARRAY WITH ELASTIC MEMORY HINGES

(71) Applicant: Composite Technology Development, Inc., Lafayette, CO (US)

(72) Inventors: Alexi Rakow, Boulder, CO (US); Naseem Munshi, Lafayette, CO (US); Dana Turse, Broomfield, CO (US); Doug Richardson, Westminster, CO (US); Larry Adams, Thornton, CO (US)

(73) Assignee: Composite Technology Development, Inc., Lafayette, CO (US)

( * ) Notice: Subject to any disclaimer, the term of this patent is extended or adjusted under 35 U.S.C. 154(b) by 152 days.

(21) Appl. No.: 15/820,676

(22) Filed: Nov. 22, 2017

(65) Prior Publication Data

US 2018/0175785 A1 Jun. 21, 2018

Related U.S. Application Data

(60) Provisional application No. 62/425,242, filed on Nov. 22, 2016.

(51) Int. Cl.
*H02S 30/20* (2014.01)
*H02S 40/40* (2014.01)
*H02S 10/40* (2014.01)

(52) U.S. Cl.
CPC .............. *H02S 30/20* (2014.12); *H02S 10/40* (2014.12); *H02S 40/40* (2014.12)

(58) Field of Classification Search
CPC ....................................................... H02S 30/20
See application file for complete search history.

(56) References Cited

U.S. PATENT DOCUMENTS

| | | | | |
|---|---|---|---|---|
| 5,720,452 A * | 2/1998 | Mutschler, Jr. | B64G 1/222 244/172.7 |
| 5,785,280 A * | 7/1998 | Baghdasarian | B64G 1/222 136/245 |
| 9,004,410 B1 * | 4/2015 | Steele | B64G 1/443 244/172.7 |
| 2016/0137319 A1 * | 5/2016 | Steele | B64G 1/443 52/745.2 |

OTHER PUBLICATIONS

Zirbel, et al., Proceedings of the 40th Aerospace Mechanisms Symposium, May 14-16, 2014 (Year: 2014).*

Lan, et al., Smart Materials and Structures, 2009, vol. 18, article 024002 (Year: 2009)*

Lan, et al., "Shape recovery performances of a deployable hinge fabricated by fiber-reinforced shape-memory polymer," Proc. SPIE 7289, Behavior and Mechanics of Multifunctional Materials and Composites 2009, 728910, Mar. 31, 2009 (Year: 2009).*

* cited by examiner

*Primary Examiner* — Sadie White

(57) ABSTRACT

Deployable solar panels are disclosed. In some embodiments, the deployable solar panel includes an extendable member comprising a composite material and having a length and a width; a plurality of hinges, each of the plurality of hinges extending across the width of the extendable member, the plurality of hinges comprising composite material and a shape memory polymer; and a plurality of solar panels coupled with the extendable member. In some embodiments, the deployable solar panel includes a lenticular shape extending along the length of the extendable member.

19 Claims, 14 Drawing Sheets

SOLAR ARRAY WITH ELASTIC MEMORY HINGES

GOVERNMENT RIGHTS

This invention was made with government support under Award Numbers NNX16CL52P and NNX17CC14C by NASA. The government has certain rights in the invention.

BACKGROUND

Conventional rigid-panel solar arrays are typically deployed with either complex mechanisms or dynamically-tuned and damped hinges. These solar arrays can be heavy and may only provide a small specific power.

SUMMARY

Deployable solar panels are disclosed. In some embodiments, the deployable solar panel includes an extendable member comprising a composite material and having a length and a width; a plurality of hinges each of the plurality of hinges extending across the width of the extendable member, the plurality of hinges distributed along the length of the deployable member, and the plurality of hinges comprises a shape memory polymer; and a plurality of solar panels coupled with the extendable member. In some embodiments, the deployable solar panel comprises lenticular shape extending along the length of the extendable member.

In some embodiments, the deployable solar panel includes a deployed configuration and stowed configuration. In the stowed configuration, the deployed solar panel is folded along the plurality of hinges. In the deployed configuration, the extendable member is extended along the length of the extendable member. In some embodiments, in the stowed configuration the plurality of hinges fold portions of the extendable member like an accordion. In some embodiments, in stowed configuration the plurality of hinges are folded to a thickness less than about one quarter of an inch. In some embodiments, the lenticular shape comprises a lenticular shape that extends along a first edge of the extendable member and a lenticular shape that extends along a second edge of the extendable member. In some embodiments, the extendable member has a thickness less than about one quarter of an inch.

In some embodiments, one or more of the plurality of solar panels are coupled with the extendable member between two of the plurality of hinges.

In some embodiments, the deployable solar panel includes a plurality of electrical heating elements coupled with each of the plurality of hinges; and a plurality of wires coupled with the plurality of electrical heating elements and extending along a portion of the deployable solar panel.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings.

DETAILED DESCRIPTION

Figure 1:
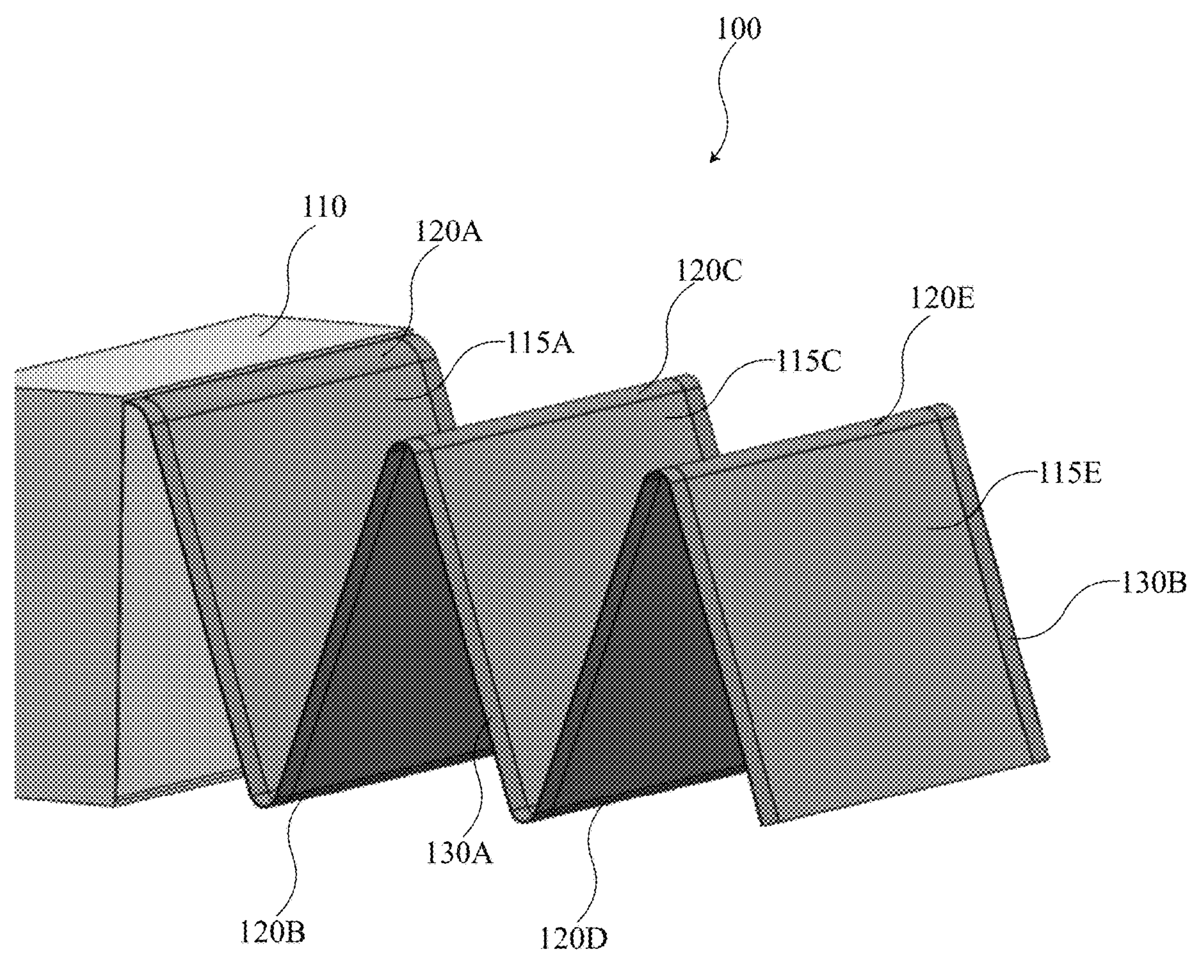
FIG. 1 is an illustration of a deployable solar array according to some embodiments.
Figure 2:
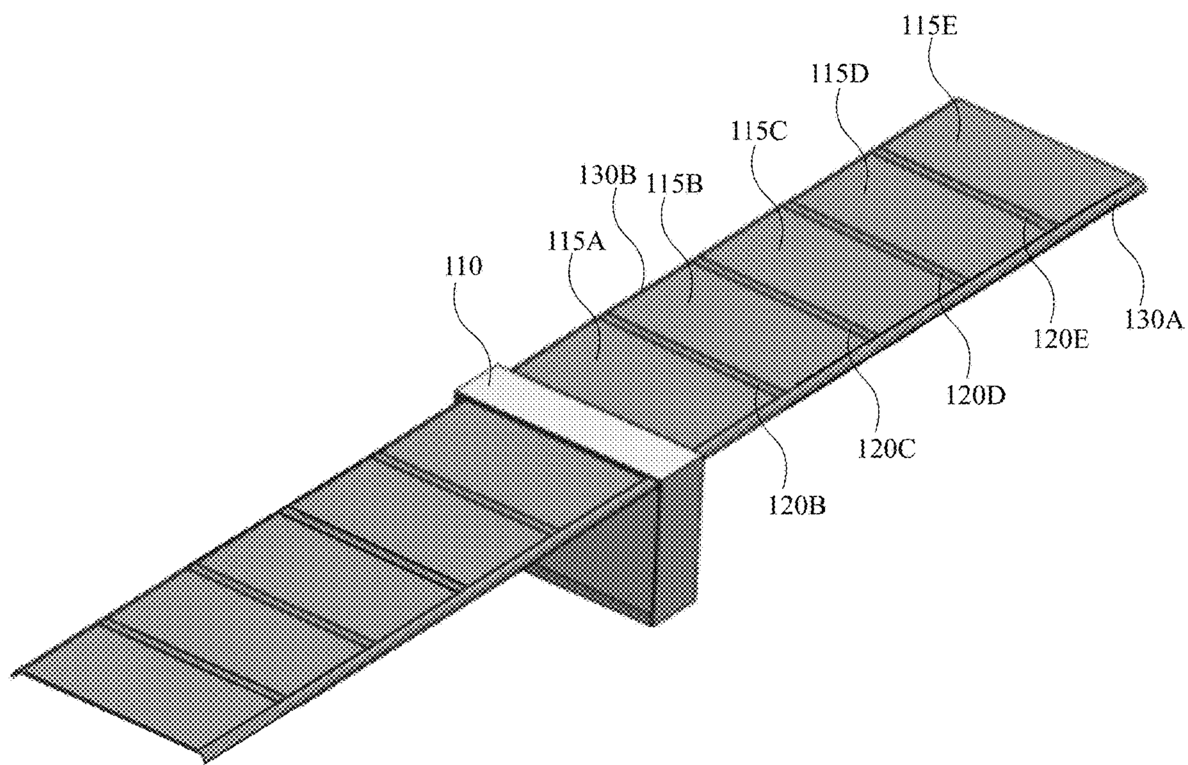
FIG. 2 is an illustration of a deployable solar array according to some embodiments.

A number of deployable solar arrays are disclosed. FIG. 1 is an illustration of a deployable solar array 100 according to some embodiments. The deployable solar array 100 can be coupled with a satellite 110 or any other type of space born device. The deployable solar array 100 includes an extendable member that can include a deployed configuration (see e.g., FIG. 2) and a stowed configuration. In FIG. 1 the deployable solar array 100 is in transition from the stowed configuration to the extended configuration.

The extendable member may include a plurality of panels 115 (individually 115A, 115B, 115C, 115D, and/or 115E; collectively or individually 115). In some embodiments, the panels of the extendable member can comprise a composite polymer material. The extendable member can also include a plurality of hinges 120 (120A, 120B, 120C, 120D, and/or 120E; collectively or individually 120). The plurality of hinges 120 may comprise a composite material with a shape memory polymer matrix such as, for example, shape memory polymer surrounding a carbon fiber fabric. The plurality of hinges 120 extend along the width of the extendable member and/or the width of the deployable solar array.

In some embodiments, the extendable member can comprise a unitary laminate composite material that has different material for the plurality of hinges 120 and different material for the plurality of panels 115. The plurality of hinges 120 and the plurality of panels 115 may be laminated in one unitary laminate body.

Figure 3A:
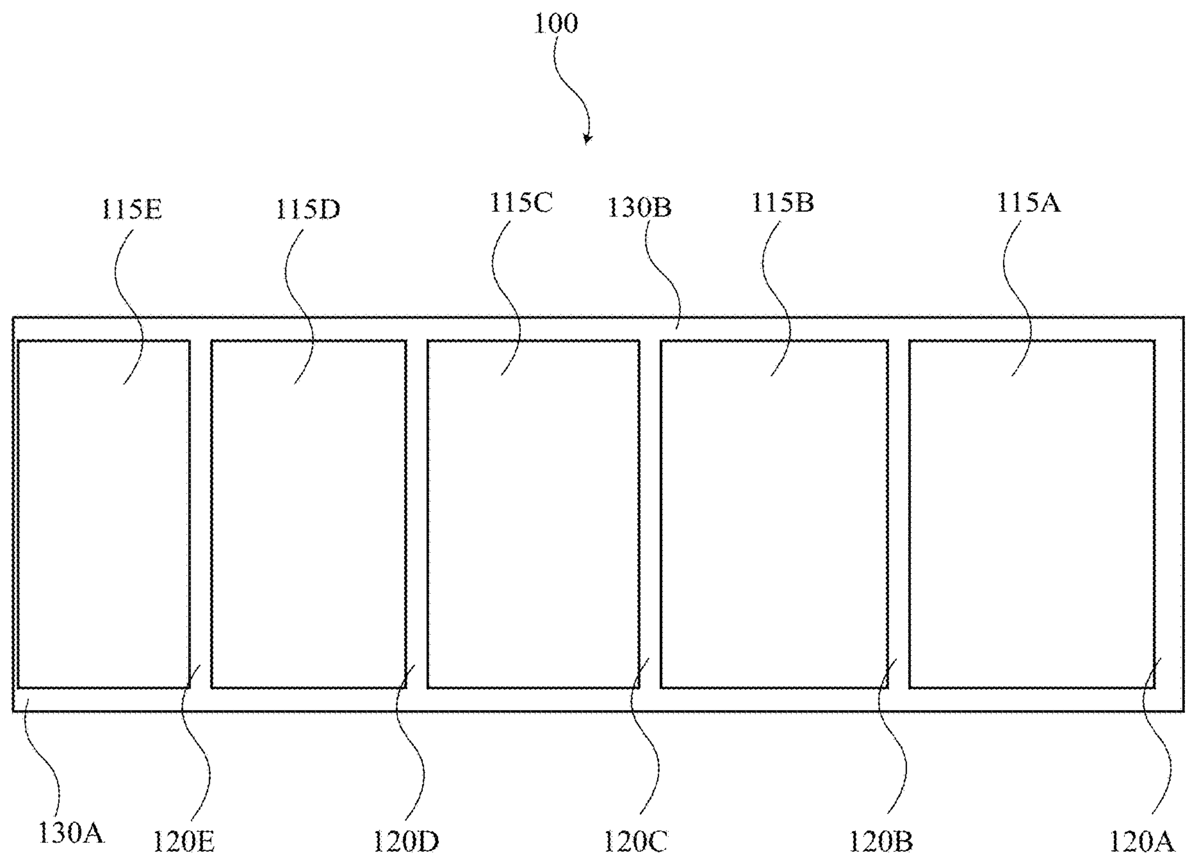
FIG. 3A is a top view of a deployable solar array according to some embodiments.
Figure 3B:
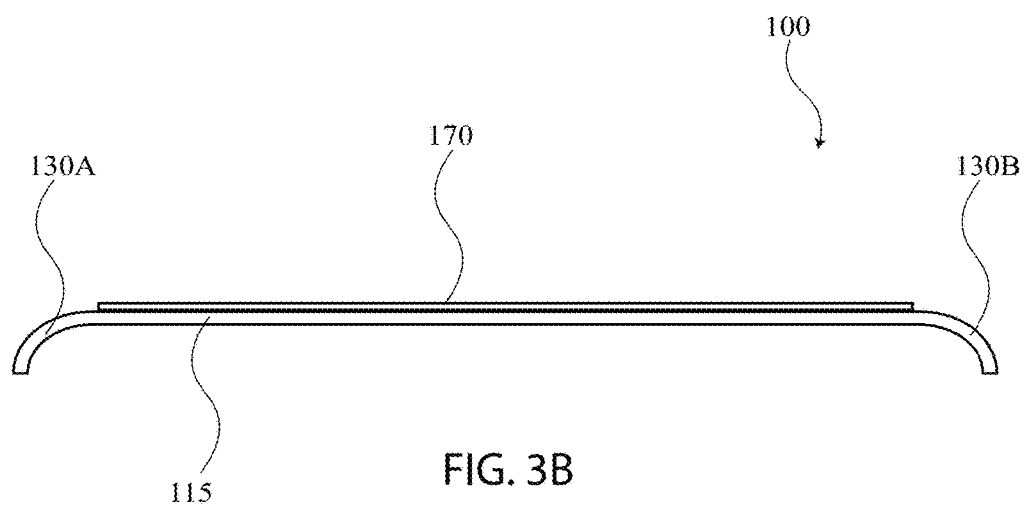
FIG. 3B is an end view of a deployable solar array according to some embodiments.

FIG. 3A is a top view of a deployable solar array 100. FIG. 3B is an end view of a deployable solar array 100.

In some embodiments, some of the plurality of panels 115 (e.g., all but one of the plurality of panels 115) can be disposed between two of the plurality of hinges 120. The last of the plurality of panels, for example, may only be coupled with one of the plurality of hinges 120. In some embodiments, a solar array may be disposed on, coupled with, attached to, etc. each of the plurality of panels 115. In some embodiments, a window may be cut in a portion of each of the plurality of panels 115 and a solar panel may be disposed within each of the windows and laminated within or within a portion of the laminate structure of the deployable solar panel 100.

In some embodiments, as shown in FIG. 3, the deployable solar array 100 can have a lenticular shape along one or both edges and extend along the length of the deployable solar array 100.

In some embodiments, the solar array may have a thickness less than about one quarter (1/25) of an inch. In some embodiments, the solar array may have a thickness less than about one tenth (1/10) of an inch. In some embodiments, the solar array may have a thickness less than about fifty thousandth (0.05) of an inch.

In some embodiments, each of the plurality of panels 115 may have a different length and about the same width. For example, the first panel 115A may have a width longer than each of the other panels. The last panel 115E may have a width shorter than each of the other panels. In some embodiments, each of the plurality of panels 115 may have successively shorter widths starting with the first panel 115A.

Figure 4A:
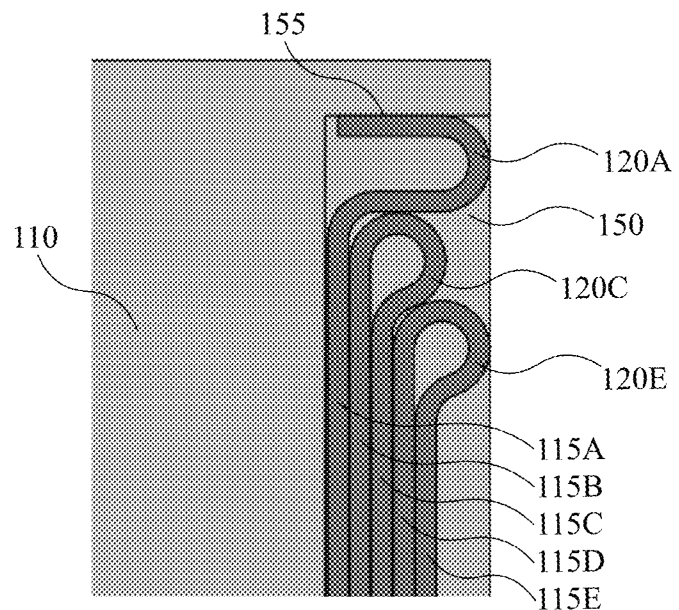
FIG. 4A shows a solar panel in a first stowed configuration.
Figure 4B:
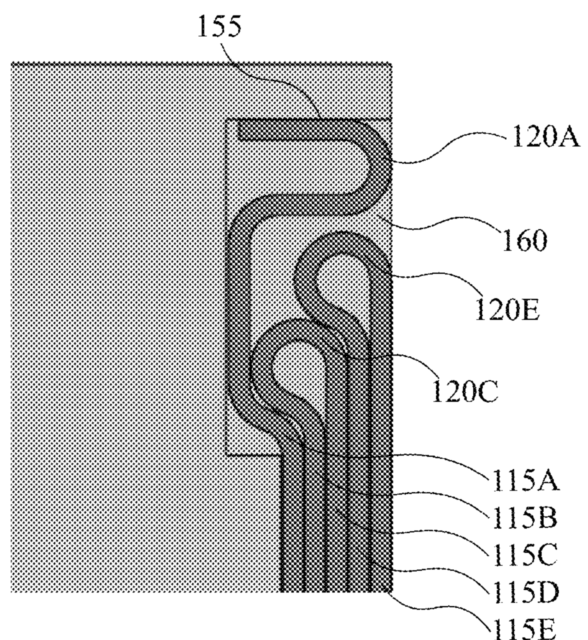
FIG. 4B shows a solar panel in a second stowed configuration.

FIG. 4A shows a solar panel in a first stowed configuration. FIG. 4B shows a solar panel in a second stowed configuration. In both stowed configuration, the extendable member is folded into P-shaped folds. In a P-shaped fold, the loops of the P-shapes are formed in the hinges. In some embodiments, the loop of the P-shaped folds may have a diameter less than about one quarter (1/25) or one tenth (1/10) of an inch. In the first stowed configuration (FIG. 4A), the plurality of panels 115 are folded away from the body 110 and stowed in cavity 150. In the second stowed configuration (FIG. 4B), the plurality of panels 115 are folded into from the body 110 and stowed in cavity 160. In these examples, the cavity 160 is smaller than the cavity 150. For example, a portion of the cavity 160 is larger to accommodate the plurality of P-shaped folds and another portion of the cavity 160 is smaller to accommodate the plurality of panels 115.

In some embodiments, each of the plurality of hinges 120 may include a heater such as, for example, a wire heater. In some embodiments, the extendable solar panel may transition from the stowed configuration to the deployed configuration by heating the shape memory hinge 120; for example, by applying power to a heater associated with the SMP hinge 120.

Figure 5:
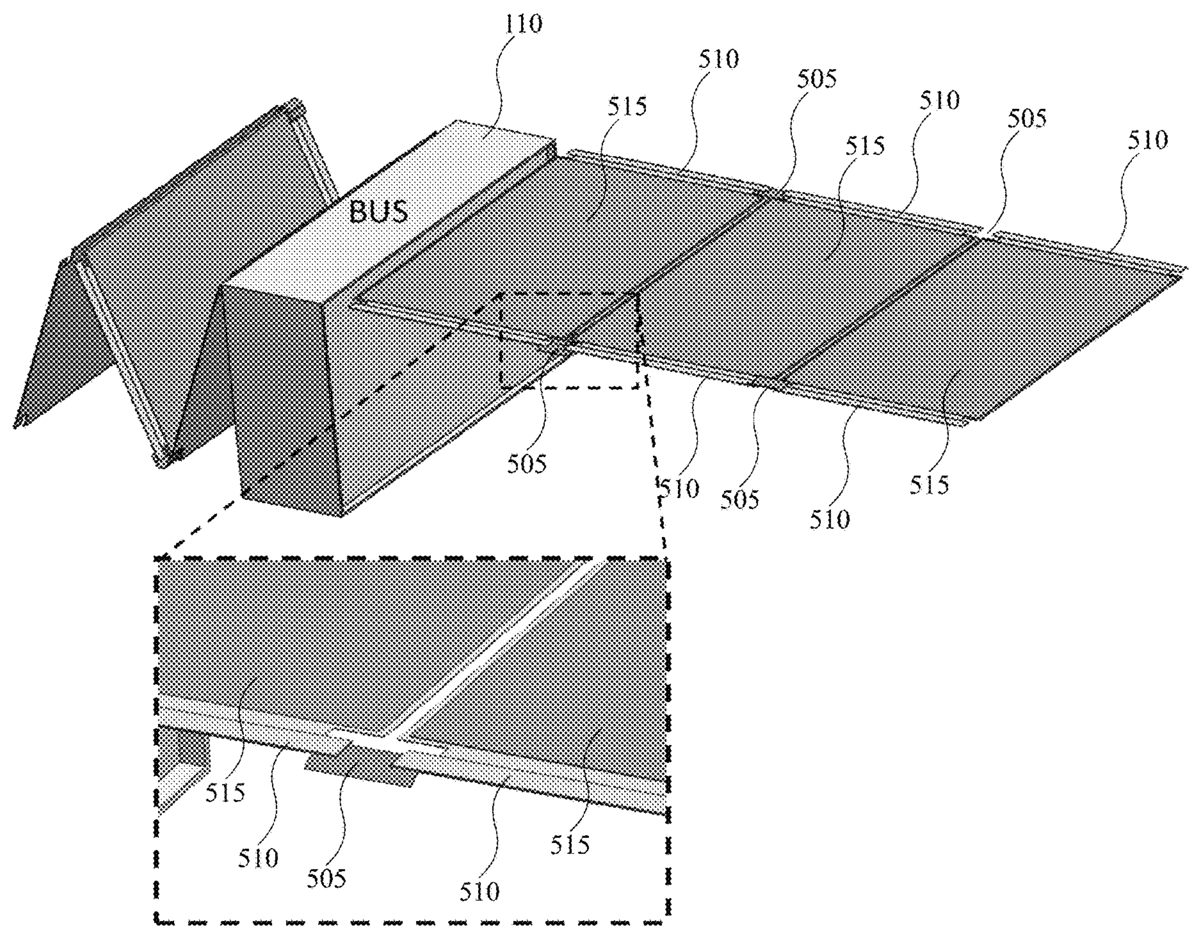
FIG. 5 illustrates an extendable solar panel according to some embodiments.

FIG. 5 illustrates an extendable solar panel according to some embodiments. In this example, the plurality of panels may be coupled together via one or more lenticular SMP hinges 505. A lenticular SMP hinge 505 may include two convex SMP pieces coupled together (back to back) with one or more heaters. The plurality of lenticular SMP hinges 505 may be coupled with rails 510. In some embodiments, a lenticular SMP hinge 505 may be coupled between the satellite body 110 and a rail 510.

Figure 6:
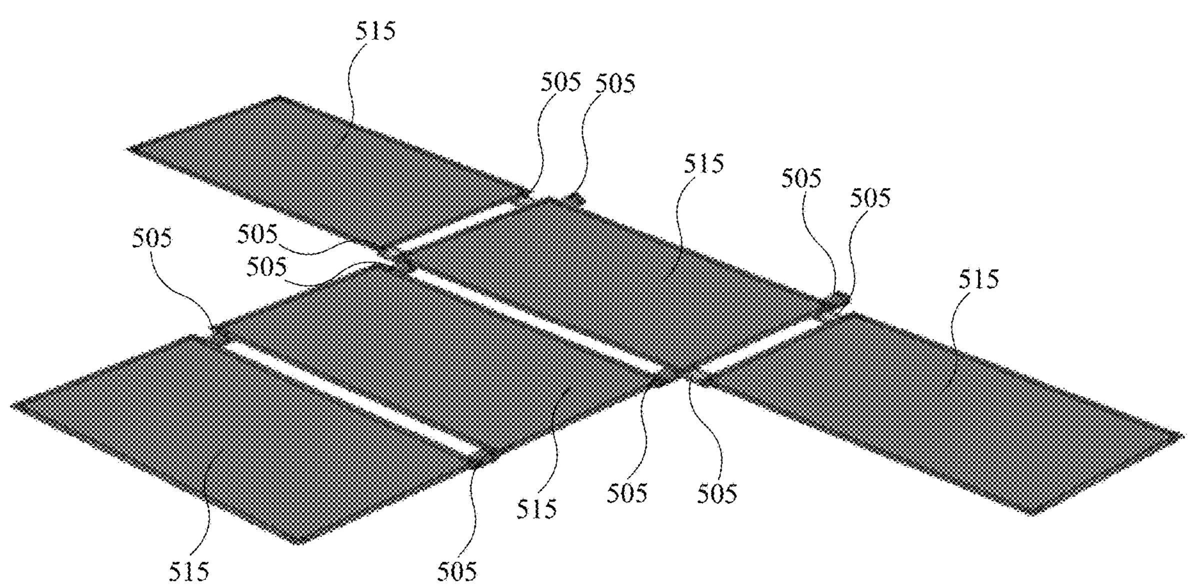
FIG. 6 illustrates an extendable solar panel in the deployed configuration according to some embodiments.

FIG. 6 illustrates the extendable solar panel in FIG. 5 in the deployed configuration according to some embodiments.

Systems and methods are disclosed for achieving high specific power via flexible solar assemblies and efficient packaging. To achieve this, one or more embodiments may include thermally controlled hinges using shape memory polymer (SMP), a flexible laminated photovoltaic (PV) glass, a circuit designed for manufacturability, and packaging of a flexible solar assembly with one or more corner rails including locking features.

Figure 7:
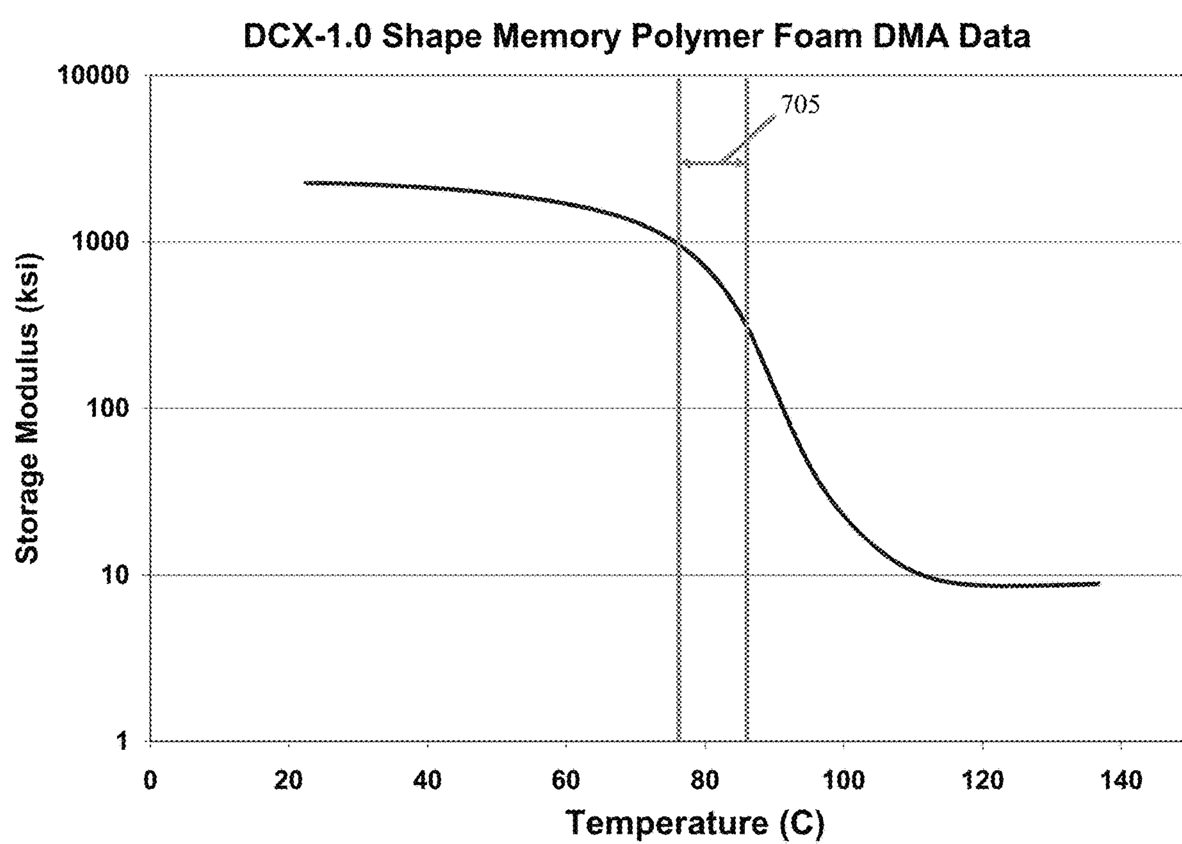
FIG. 7 is an example interaction of modulus vs. temperature of a shape memory polymer.

In one or more embodiments, SMP (shape memory polymer) hinges may be used at a hinge line of a solar array. Like many polymers, the Young's Modulus, E, of a shape memory polymer may decrease as the temperature increases. Shape memory polymers are characterized by a distinct and significant drop in stiffness at a temperature that is well below the temperature where the polymer is damaged. This drop-in stiffness may occur, for example, around the glass transition temperature, or Tg, of the polymer. A typical modulus vs. temperature plot is shown in FIG. 7. For temperatures below the glass transition temperature the polymer may display "glassy" properties with a higher modules and lower strain-to-failure. Above the glass transition temperature, the polymer may display elastomeric properties, with a low modulus and high strain-to-failure. The behavior above Tg is enabled by the presence of enough thermal energy to allow shifts in the alignment of the polymer chains. Below Tg, there is insufficient thermal energy to allow alignment shifts.

The SMP hinges may utilize the change in properties around Tg in a complex fashion. First, the thermoset shape memory polymer may be cured in the deployed shape. This may be the low energy state/desired shape of the device. When the shape memory polymer is heated above Tg it can be forced into a high energy stowed position, and then cooled below Tg. This can "freeze" the polymer chain alignment shifts, and the device may retain this stowed shape. In addition, the polymer may display modulus and strain-to-failure characteristics typical of the regime in the stowed shape. While in this stowed position the hinge may resist the deployment torque of an elastic deployment spring. To achieve deployment, the shape memory polymer may be slowly heated. This heating may cause the polymer to soften and lose stiffness, allowing the polymer to actuate via forces imposed from the elastic deployment spring.

In some embodiments, if the temperature is held in the range 705 shown in FIG. 7, then the polymer chains may randomly and slowly gain enough thermal energy to slip alignments and the deployment/actuation may proceed slowly. The timing of this process is highly repeatable if the same temperature profile is followed. Excess torque may be intrinsically restrained by the heat rate of the polymer, preventing an SMP hinge with less resistive torque or inertia from deploying faster than an SMP hinge with more resistive torque or inertia. An SMP hinge, for example, may deploy in a timeframe dictated by heat-enabled slips of the polymer matrix; fundamentally decoupling inertial mass and resistive torque from deployment time.

In some embodiments, the initial deployment time for an SMP hinge may be 5 minutes, while in other embodiments, less than 5 minutes or more than 5 minutes. Since a strain-free state of the shape memory polymer is the deployed state, with enough heat and time it may provide a small positive deployment torque. The thermo-mechanical process can be repeated to reset the SMP hinge to the stowed state many times (cycles).

Proper function of the SMP hinges may be dependent upon careful and repeatable heating of the SMP hinge to or above Tg (~80° C. for CTD's DCX-1.0 SMP resin system or TEMBO® equivalent). Some embodiments may be tailored to achieve a Tg from ~60° C. to ~150° C. In some embodiments, an SMP hinge can be isolated from the widely varying temperatures of the on-orbit environment with proper multi-layer insulation. The insulation may both protect the SMP hinges from unwanted elevated temperatures and also enable the hinge to be heated properly during the desired deployment time. Once the hinges are thermally isolated a consistent and predictable heat source can be applied to control the hinge deployment.

In some embodiments, the SMP resins, TEMBO® or otherwise, can be used to fabricate an SMP hinge. In some embodiments, SMP resins can be fabricated into integral open cell foam, or neat resin, rate-limitation devices, or controlled deployment devices. The shape memory polymer resins, for example, may be high-strain-to-failure, fully cured, thermoset (i.e., epoxy or cyanate ester), low-outgassing resins that provide excellent shape memory performance and enable very robust packaging and deployment over many cycles for a variety of solar array designs.

Figure 8:
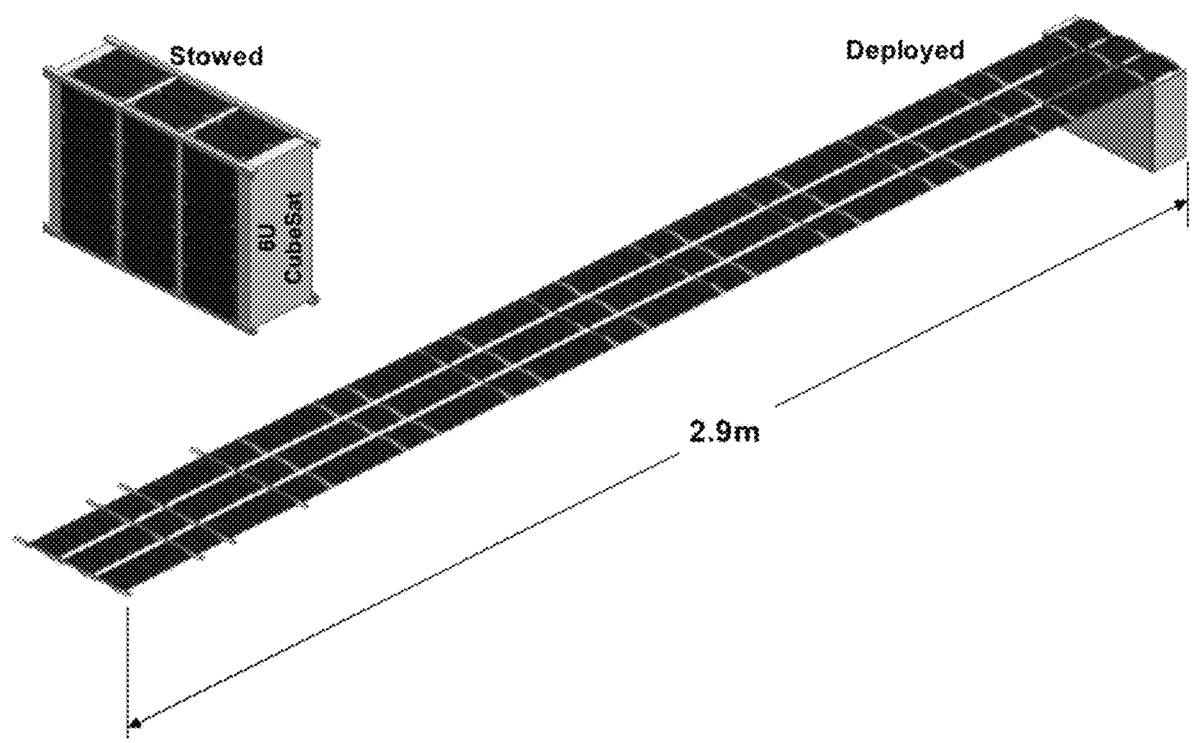
FIG. 8 are examples of stowed and deployed embodiments of a solar array.

For example, in some embodiments, a solar array with a plurality of SMP hinges may be wrapped around a CubeSat in a stowed position; and outstretched, but connected to the CubeSat in a deployed position as shown in FIG. 8. Other configurations, both stowed and deployed, are contemplated. For example, when deployed in some embodiments, the CubeSat may be positioned between two deployed solar arrays, which constitutes a dual-wing configuration. By way of further example, the CubeSat need not be limited to a CubeSat alone; rather, it may also be any variation of any satellite or SmallSat such that one or more solar arrays may be rolled out from within the SmallSat.

Figure 9:
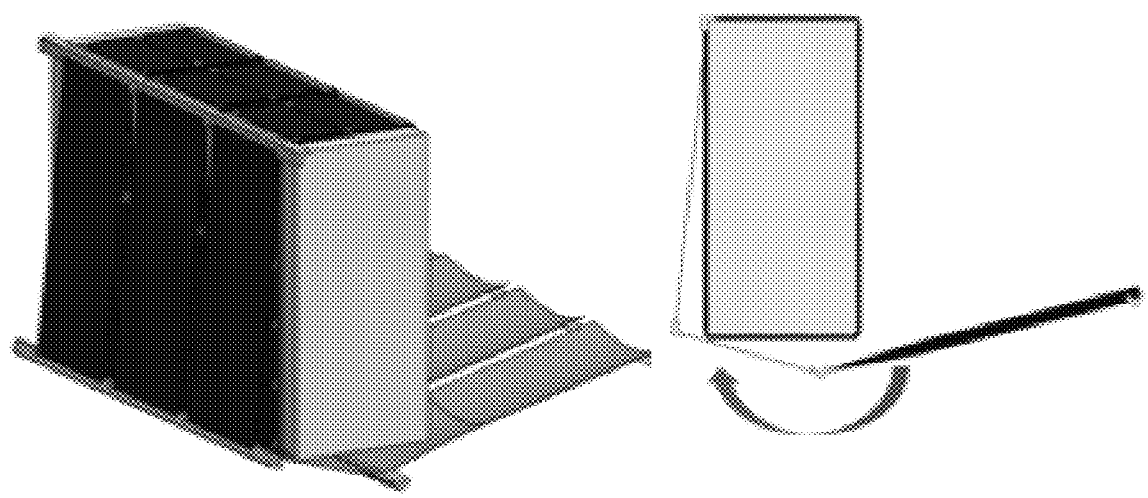
FIG. 9 is an example embodiment of controlled deployment of the solar array.

In some embodiments, the SMP hinges of a solar array may be heated using electric heaters to transition the solar array from the stowed position to the deployed position. For example, each of the plurality of SMP hinges may be heated sequentially (one by one) as depicted in FIG. 9, when transitioning from a stowed to a deployed configuration. In this manner, the SMP hinges may control deployment of the solar array, for example, managing energy release and deployment torque.

In some embodiments, variations in orbit conditions, blanket installation, hinge position within the array, and/or other unpredictable factors could cause the hinges to follow different temperature profiles with a fixed voltage control method for each of the plurality of SMP hinges. In some embodiments, a feedback control loop utilizing thermocouples and cycling power on or off with a microcontroller may define the deployment of the plurality of SMP hinges, which may, for example, allow for accurate control of the temperature profile of each SMP hinge. One or more of the plurality of hinges, for example, may be supplied with any voltage source, power supply, controller, etc. For example, a 28V power supply may be used to initiate deployment, and/or a microcontroller may follow the same temperature profile to achieve nearly identical deployment times for each individual hinge. Based on the anticipated thermal mass of the hinge, for example, the required power may be less than 10 W per hinge.

The deployment time of an SMP hinge could be varied by changing the temperature profile of a microcontroller.

Figure 10:
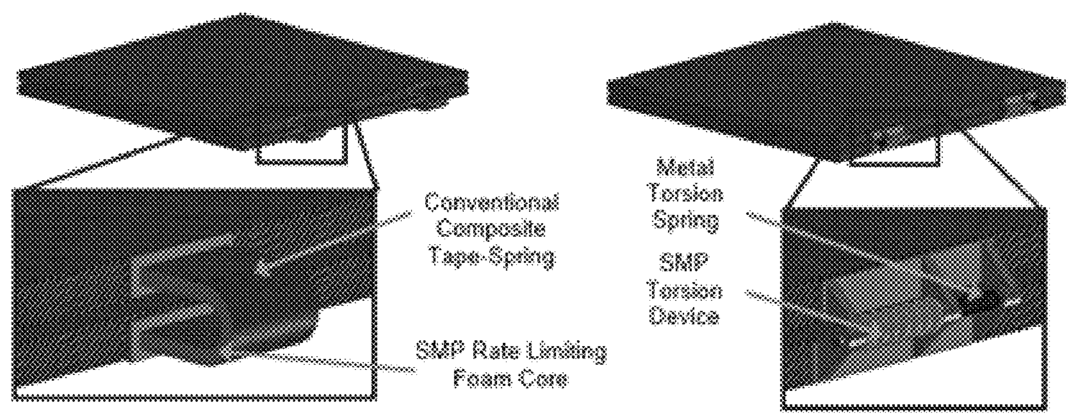
FIG. 10 illustrates example embodiments of the solar array with rate control deployment via example SMP hinges.
Figure 14A:
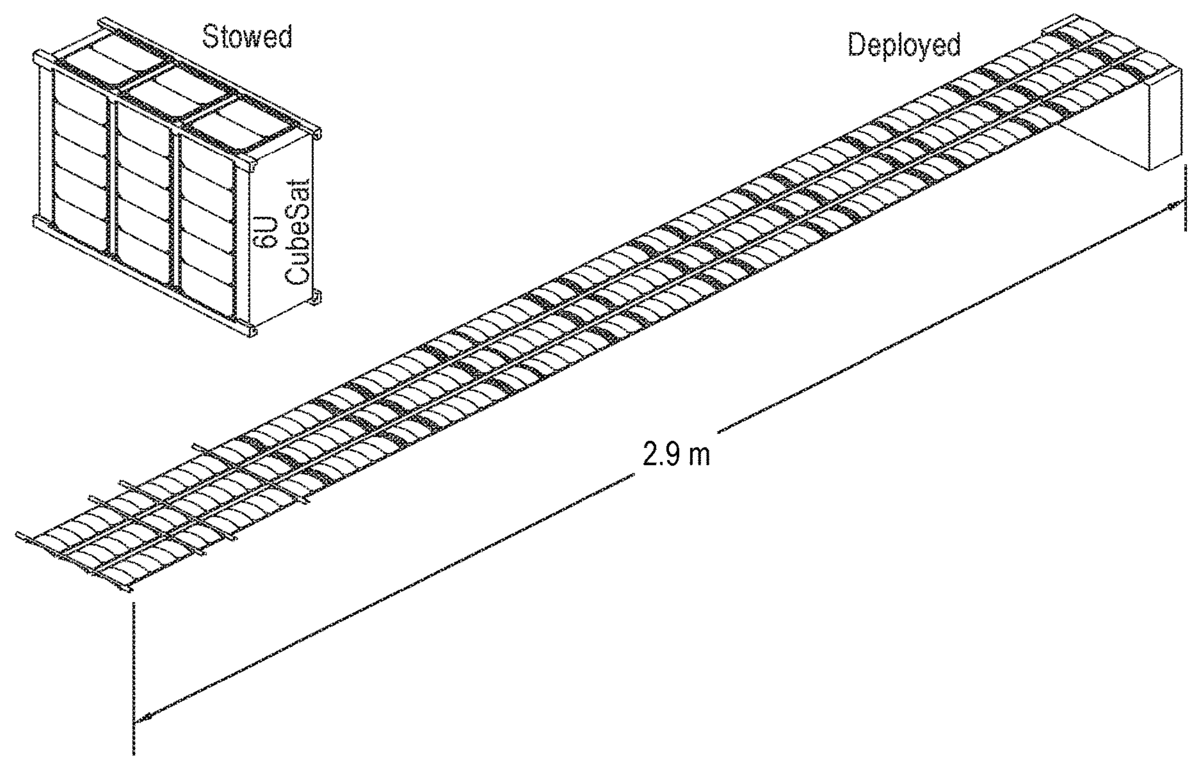
FIGS. 14A & 14B illustrate example SMP hinges according to some embodiments.
Figure 14B:
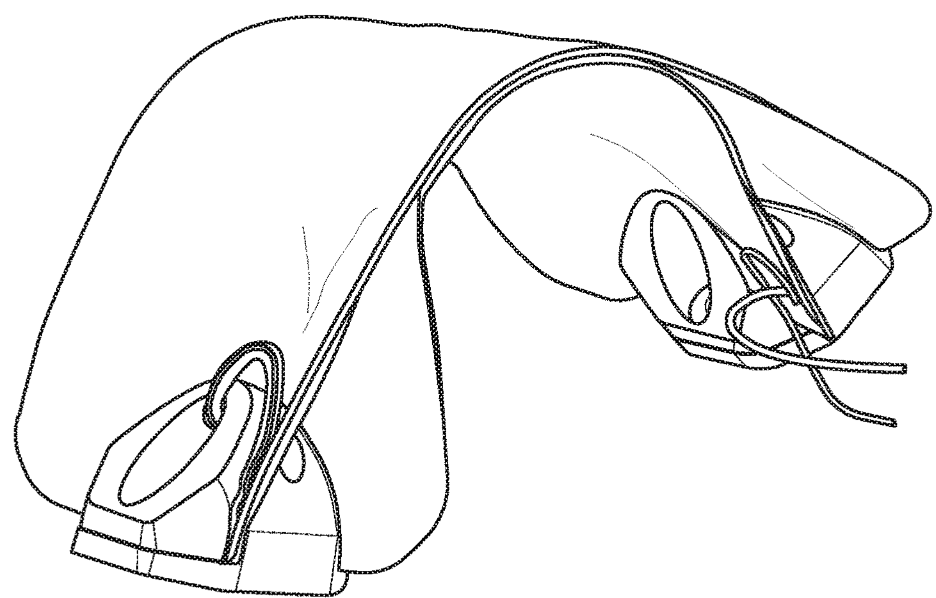

In some embodiments, a Tape Spring SMP Hinge may be used as shown in FIGS. 14A and 14B. A Tape Spring SMP Hinge may, for example, include a composite material with a shape memory polymer matrix such as, for example, shape memory polymer surrounding a carbon fiber fabric. A tape spring hinge, for example, may be similar to an elastic memory hinge, or EMCH. An elastic memory hinge, for example, may include a hinge comprised of a mixture of carbon fiber strands and an epoxy resin. An elastic memory hinge, for example, may operate by temperature application; for example, the hinge may be pliable when heated above the glass transition temperature of the hinge material and stiff while cooled below the glass transition temperature of the hinge material. In some embodiments, an SMP Hinge may be different in how the shape memory material is utilized. For example, an SMP Hinge may have a much higher torque output, and/or may be speed controlled by the SMP characteristics. In some embodiments, the tape-spring variant of the SMP Hinge may include tape spring blades formed from a conventional composite. These blades may function elastically, which may, for example, produce significant and/or consistent deployment torque. In some embodiments, the blades may be held in the stowed position by shape memory polymer foam that may be bonded between the two tape spring elements. An example is shown in FIG. 10.

In some embodiments, the tape spring SMP Hinge may or may not retain some desirable features from EMCH. One common feature is compliance in the stowed state. Stowed SMP Hinge compliance may allow integration to occur at the solar panel level with tolerance stack-up (in the solar panel stack) being less of a concern. Since the tape spring hinge can accommodate reduced panel tolerances, this configuration may, for example, be ideal for a low cost, modular solar array. In some embodiments, the tape spring SMP Hinge may also lock out in the deployed state to provide significant deployed stiffness with no deadband.

Some embodiment may include an SMP Torsional Spring Hinge. An SMP torsional spring hinge may, for example, be based on typical designs for solar array panel hinges. An SMP torsional spring hinge may be modified by replacing a damper with a rate limiting device fashioned from reinforced shape memory polymer, as shown in FIG. 10. The SMP rate limiter, for example, could be a coil spring, or a torsion rod that is formed in the deployed state and heat cycled to freeze in the stowed shape. The SMP element may be sized to provide sufficient resistive torque in the cold state to lock out the metallic torsional spring hinge. In some embodiments, the SMP element can be thermally insulated with internal resistive heaters to control the deployment temperature profile. Other embodiments allowing for incorporation of thermal hinges are contemplated.

Figure 11:
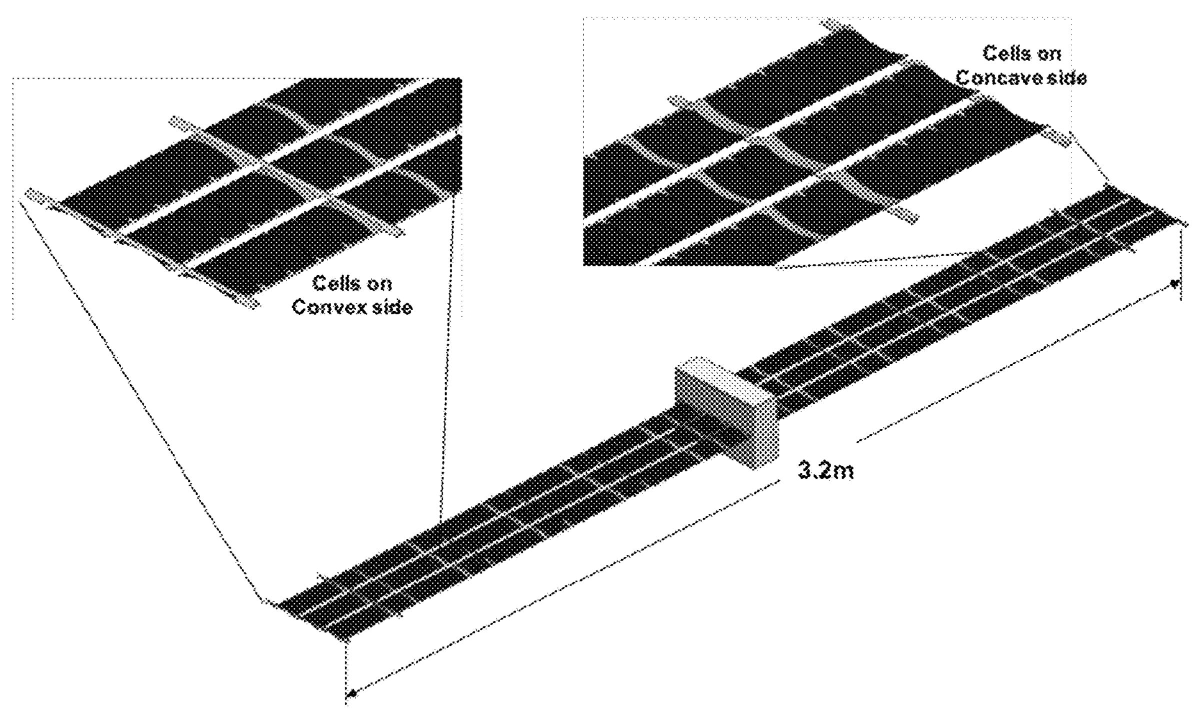
FIG. 11 illustrates example cell positions on the solar array in addition to an example dual-wing configuration.

In some embodiments, one or more surfaces of the solar array may include photovoltaic (PV) cells, a plurality of which may amount to a photovoltaic cell laminate/blanket, which can encompass one or more portions of the solar array and/or any support elements. For example, in some embodiments, the PV laminate may be on a top side, a bottom side, or both of a solar blanket. In some embodiments, if the solar array is curved, the PV laminate may be positioned on a convex side, a concave side, or both as seen in FIG. 11.

In some embodiments, the photovoltaic cells may be, for example, silicone photovoltaic cells. Further, for example, the photovoltaic cells may include an amorphous silicon alloy or copper indium gallium deselinide cells deposited on a thin metallic or polyimide substrate. Other materials compatible with the intended scope and use of the various embodiments are contemplated.

A PV laminate can effectively unify various elements (e.g., longerons, battens, and/or other structural members within the laminate) into a single, laminated structure. In some embodiments, the photovoltaic cells can be configured to be stowed as a roll, e.g., wrapped around a CubeSat or some other 3-D polygon, requiring a tight radius of curvature. In other embodiments, the PV laminate may be wrapped, rolled, or otherwise stowed inside a 3-D polygon. In some embodiments, the photovoltaic laminate may be mounted to the solar array via any assortment of attachments at any location not interfering with the intended scope and use of the solar array, including via grommets, elastic cords, cables, clips, screws, nails, staples, magnets, epoxy, glue, other bonding agents, and the like.

In some embodiments, the PV laminate may include a laminate layup of varying configurations. In some embodiments, the laminate layup may include lamina having various types, materials, thicknesses, lengths, continuity, and directions of fibers. In some embodiments, the laminate layup may include lamina with curvature, varying lengths or widths, or other physical variables. In so doing, the PV laminate may demonstrate any number of composite properties (e.g., specific strength, stiffness, Poisson's ratio, etc.) as designed for a particular application or use such as deployment and/or stowing of the solar array. And in some embodiments, certain stresses, strains, and/or other engineering factors present during such uses may determine an appropriate laminate layup (and vice-versa).

In some embodiments, other factors may impact performance metrics and/or determine the laminate layup (and vice-versa). In other embodiments, one or more factors may be independent of the performance metrics and/or the laminate layup. Some of those factors include a single v. dual wing design, a launch lock mechanism, single v. multiple beam construction, different PV cell sizes, beam curvature with respect to PVA allowables and cosine loss, layout of flexible circuitry, multi-layer insulation (MLI) on SMP hinges, and the like.

In some embodiments, the solar array includes a flexible circuitry. The flexible circuitry may physically and/or electrically couple one or more of the above-mentioned photovoltaic cells. In some embodiments, the PV cells may be spatially distanced away from the hinge line where the flexible PV laminate may fold. In some embodiments, the flexible circuitry may allow for a tight radius of curvature (r.o.c.) at the hinge lines.

In some embodiments, the flexible circuitry is tested and wired for integration into any of the described embodiments such that electrical power, mass, magnetic moment, and other common parameters for solar arrays may be provided, monitored, recorded, and/or analyzed.

Additionally or alternatively, in some embodiments the flexible circuitry includes and/or is positioned onto composite, fiber-reinforced plastic.

Figure 12:
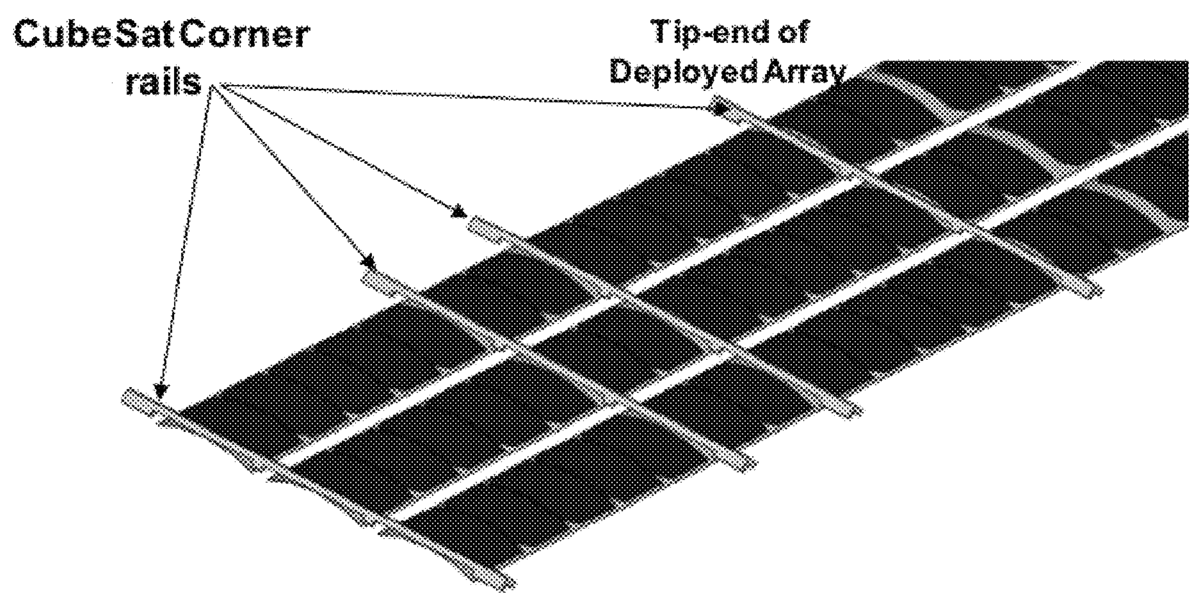
FIG. 12 illustrates example corner rails and battens in a deployed configuration according to some embodiments.

In some embodiments, the solar array may include corner rails (or battens) for launcher compatibility. The corner rails, for example, may only be included in the first four joints (or with the first four SMP hinges) so that the corner rails are disposed on the corners when in the stowed configuration. In some embodiments, the corner rails may be part of and/or separately attached to battens seen in FIG. 12. In other embodiments, one or more of the corner rails may be present without one of the battens. In the deployed position, the corner rails may extend outwardly beyond the solar array. However, in other embodiments, the corner rails may be partially or entirely inside a surface area of the solar array. In any embodiment, the position of the corner rail may be independent of the position of the solar array, and in other embodiments, dependent on the position of the solar array.

In some embodiments, one or more of the corner rails may be pinned or otherwise attached to a center of one or more of the tape springs (or its functional equivalent). In other embodiments, one or more of the corner rails may be attached at a position not at the center of the one or more tape springs (or its functional equivalent). Additionally, in some embodiments during deployment of the solar array, the corner rails may tie together the one or more tape springs (or its functional equivalent) such that the corner rails improve deployment coordination. Additionally or alternatively, in some embodiments during re-packaging of the solar array, the corner rails may interact with the one or more tape springs (or its functional equivalent) such that the corner rails improve re-packaging coordination.

In some embodiments, the battens may align with the hinge lines of the solar array. In some embodiments, the battens may be present at each and every hinge line, while in other embodiments, at less than every hinge line in the solar array.

Figure 13:
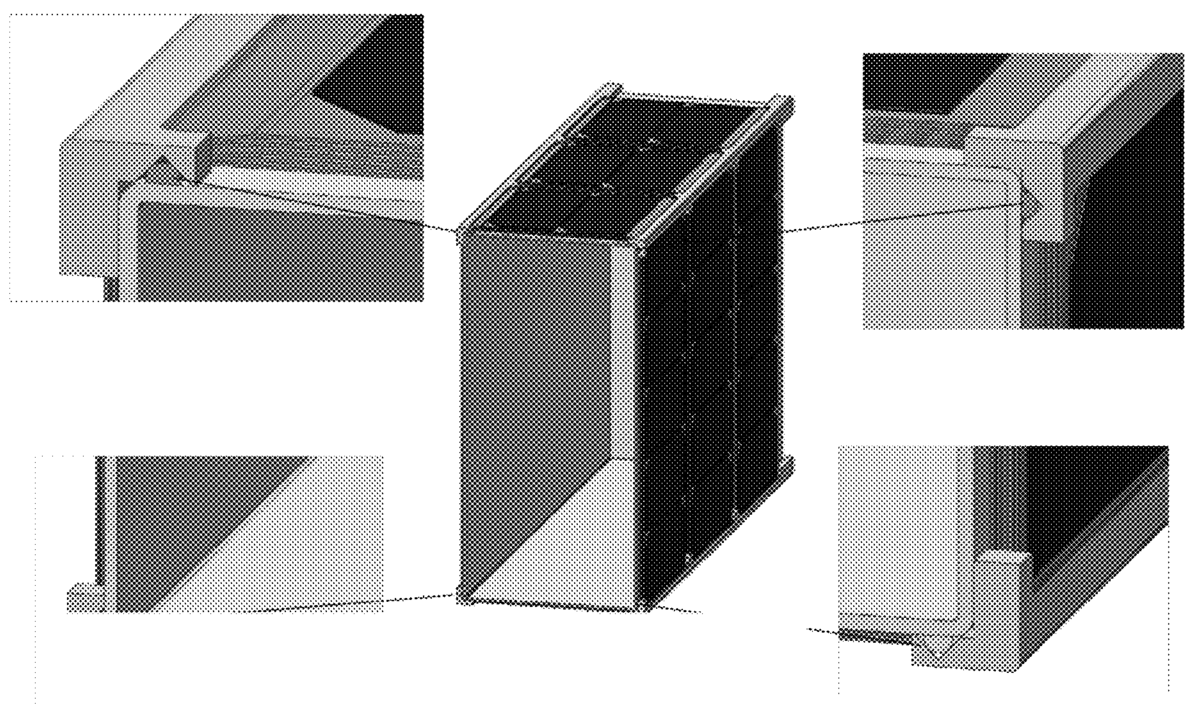
FIG. 13 illustrates example corner rails and locking features according to some embodiments.

In some embodiments, the corner rails may include locking features. The locking features may aid in keeping the solar array in a particular position, e.g., the deployed position, stowed position, and/or some position between the deployed position and the stowed position. Additionally or alternatively, in some embodiments, the CubeSat may include locking features. For example, in some embodiments, the locking features of the CubeSat and the locking features of the corner rails may interlock together in some mating fashion. One embodiment is depicted in FIG. 13. In this embodiment, a cup/cone design is incorporated. However, other embodiments may use any interlocking design. In some embodiments, the locking features may include materials, finishes, surface roughnesses, nanoparticles, magnetism, or the like to aid interlocking of the locking features.

In some embodiments, the locking features may be locked and unlocked upon mechanical, electrical, thermal, other means, or any combination thereof available in a space environment.

The term "substantially" means within 5% or 10% of the value referred to or within manufacturing tolerances.

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A deployable solar panel comprising:

an extendable member comprising a composite material and having a length and a width, wherein the extendable member is extendable along the length of the extendable member;

a plurality of hinges, each of the plurality of hinges extending across the width of the extendable member, the plurality of hinges are coupled with and distinct from the extendable member, and each of the plurality of hinges is distributed along the length of the extendable member, and the plurality of hinges comprises a composite material and a shape memory polymer; and a plurality of solar panels coupled with the extendable member between the plurality of hinges, wherein each of the plurality of solar panels have a width that is less than the width of the extendable member.

2. The deployable solar panel according to claim 1, further comprising a lenticular shape extending along the length of the extendable member.

3. The deployable solar panel according to claim 2, wherein the lenticular shape comprises a lenticular shape that extends along a first edge of the extendable member and a lenticular shape that extends along a second edge of the extendable member.

4. The deployable solar panel according to claim 1, wherein the deployable solar panel comprises a stowed configuration, wherein in the stowed configuration the deployable solar panel is folded along the plurality of hinges, and wherein the deployable solar panel is configured to transition to a deployed configuration, wherein in the deployed configuration the extendable member is extended along the length of the extendable member.

5. The deployable solar panel according to claim 4, wherein in stowed configuration the plurality of hinges fold portions of the extendable member like an accordion.

6. The deployable solar panel according to claim 4, wherein in stowed configuration each of the plurality of hinges are folded to a thickness less than about one quarter of an inch.

7. The deployable solar panel according to claim 1, wherein one or more of the plurality of solar panels are coupled with the extendable member between two of the plurality of hinges.

8. The deployable solar panel according to claim 1, further comprising a plurality of electrical heating elements coupled with each of the plurality of hinges; and a plurality of wires coupled with the plurality of electrical heating elements and extending along a portion of the deployable solar panel.

9. The deployable solar panel according to claim 1, wherein the extendable member has a thickness less than about one quarter of an inch.

10. A deployable solar panel comprising:

an extendable member having a length and a width, and comprising:

a first composite material section having a first length and a first width;

a second composite material section having a second length and a second width, the second length being less than the first length;

a first shape memory polymer hinge section coupled with and between the first composite material section and the second composite material section, where the first shape memory polymer hinge is distinct from the first composite material section and the second composite material section, and the first shape memory polymer hinge extends along the first width of the first composite material section and along the second width of the second composite material section;

a third composite material section having a third length and a third width, the third length being less than the second length;

a second shape memory polymer hinge section coupled with and between the second composite material section and the third composite material section, where the second shape memory polymer hinge is distinct from the second composite material section and the third composite material section, and the second shape memory polymer hinge extends along the third width of the third composite material section and along the second width of the second composite material section; and a lenticular shape that extends along the length of the first composite material section, the second composite material section, the third composite material section, the first shape memory polymer hinge, and the second shape memory polymer hinge;

a first solar panel coupled with the first composite material section, wherein the first solar panel has a width that is less than the first width;

a second solar panel coupled with the second composite material section, wherein the second solar panel has a width that is less than the second width;

a third solar panel coupled with the third composite material section, wherein the third solar panel has a width that is less than the third width.

11. The deployable solar panel according to claim 10, wherein the extendable member comprises a single laminate body.

12. The deployable solar panel according to claim 10, wherein the deployable solar panel comprises a single laminate body.

13. The deployable solar panel according to claim 10, wherein the deployable solar panel comprises a stowed configuration, wherein in the stowed configuration the deployable solar panel is folded along the first shape memory polymer hinge and the second shape memory polymer hinge, and wherein the deployable solar panel is configured to transition to a deployed configuration, wherein in the deployed configuration the extendable member is extended along the length of the extendable member.

14. The deployable solar panel according to claim 13, wherein in the stowed configuration the plurality of hinges fold portions of the extendable member like an accordion.

15. The deployable solar panel according to claim 13, wherein in the stowed configuration the first shape memory polymer hinge and the second shape memory polymer hinge are folded to a thickness less than about one quarter of an inch.

16. The deployable solar panel according to claim 10, further comprising:

a plurality of electrical heating elements coupled with the first shape memory polymer hinge and the second shape memory polymer hinge; and a plurality of wires coupled with the plurality of electrical heating elements and extending along a portion of the deployable solar panel.

17. The deployable solar panel according to claim 10, wherein the lenticular shape comprises a lenticular shape that extends along a first edge of the extendable member and a lenticular shape that extends along a second edge of the extendable member.

18. The deployable solar panel according to claim 10, wherein the extendable member has a thickness less than about one quarter of an inch.

19. The deployable solar panel according to claim 10, further comprising:

a fourth composite material section having a fourth length, the fourth length being less than the third length;

a third shape memory polymer hinge section between the third composite material section and the fourth composite material section, where the third shape memory polymer hinge is distinct from the third composite material section and the fourth composite material section;

a fifth composite material section having a fifth length, the fifth length being less than the fourth length;

a fourth shape memory polymer hinge section between the fourth composite material section and the fifth composite material section, where the fourth shape memory polymer hinge is distinct from the fourth composite material section and the fifth composite material section;

a fourth solar panel coupled with the fourth composite material section; and a fifth solar panel coupled with the fifth composite material section.

* * * * *